United States Patent [19]

Farmer

[11] Patent Number: 4,596,105
[45] Date of Patent: Jun. 24, 1986

[54] CROSSARM BRACE FOR UTILITY POLE

[75] Inventor: Marion R. Farmer, Shelby County, Tenn.

[73] Assignee: Aluma-Form, Inc., Memphis, Tenn.

[21] Appl. No.: 681,666

[22] Filed: Dec. 14, 1984

[51] Int. Cl.⁴ .............................................. E04C 3/02
[52] U.S. Cl. ......................................... 52/697; 52/40; 52/720; 403/381
[58] Field of Search ................... 52/40, 697, 720, 696; 403/279, 282, 283, 406, 331, 381

[56] References Cited

U.S. PATENT DOCUMENTS 3,468,571  9/1969  Farmer ............................... 403/381

FOREIGN PATENT DOCUMENTS 767416  9/1980  U.S.S.R. ............................ 403/381

Primary Examiner—Carl D. Friedman
Assistant Examiner—Naoko N. Slack
Attorney, Agent, or Firm—Paul M. Denk

[57] ABSTRACT

An extension brace for supporting a crossarm on a utility pole, having an insulated central section and ribbed brackets attached to the opposite ends of the central section, with the brackets carrying drilled strap means for attachment to the utility pole and the crossarm, with the brackets formed incorporating integrally disposed hook means for partial embedment within the proximate ends of the crossarm to which the brackets connect.

2 Claims, 3 Drawing Figures

CROSSARM BRACE FOR UTILITY POLE

BACKGROUND OF THE INVENTION

The present invention relates to brace means for utility pole crossarms, and more particularly to an extended brace means for utility pole crossarms having substantially positive interlocking features carried by the brace for attachment of the crossarm to a utility pole.

The present invention further relates to methods for attaching bracketed end fixtures to an insulated brace to form brace extension means adapted for supporting crossarms onto utility poles.

There have been prior devices adapted for use in supporting crossarms upon utility poles, but these prior devices have relied upon brackets provided with means for adaption and for abutting engagement with the ends of the braces for securement and support with the utility pole. These prior devices have additionally been provided with detachable connection means which have, after exposure to weather, dry rot incident thereto, and vibration, become loosened, thus rendering the brace means attached thereto substantially inefficient to effectively support the crossarm in a normal manner upon a utility pole. These types of devices can be seen in the prior U.S. Pat. Nos. 1,815,598; 2,283,943; and 2,906,379. In addition to the foregoing, means have been provided for furnishing a more stable securement of the crossarm to a utility pole, through the use of bracket means related to this current invention, and which have been effective for its intended purpose of stably connecting the brace means with the crossarm, and also both to the utility pole, and in a manner to overcome the detriments as previously described. This can be seen in the U.S. Pat. No. 3,468,571, earlier issued to the current inventor, and which earlier patent and this current invention are owned by a common assignee.

It is, therefore, the principal object of this invention to provide a crossarm brace means that more firmly secures with its cooperating components in their stabilizing of and supporting the crossarm high upon a utility pole.

These and additional advantages through the usage of this current invention will become more apparent to those skilled in the art upon reviewing the summary of this invention, and upon undertaking a study of the description of its preferred embodiment.

SUMMARY OF THE INVENTION

The present invention provides a brace means for crossarms mounted on a utility pole, and more particularly, the method of application of such a brace means and the technique of forming the same. This present invention further provides a utility crossarm supporting brace, generally being two in number, having bracketed end members firmly affixed thereto, and in such a manner as to withstand the forces of weather and vibrations without becoming disengaged from the brace, such as may occur with prior art type of devices, particularly where the wood end may become warped or subjected to dry rot after prolonged installation and usage.

The present invention additionally provides brace means for utility pole crossarms having attachment means affixed thereto without the necessity of utilizing conventional fastening means such as screws, bolts, pins, or the like, and which have a tendency to subject the wood or other formed crossarms to more accelerated deterioration. The present invention is actually an improvement upon that crossarm brace means as shown and described in my prior U.S. Pat. No. 3,468,571.

Some of the primary objects of this current invention are to provide a length of brace means for utility pole crossarms, and which extend a significant distance downwardly so as to provide full support and stabilization for the crossarm to which it connects. Another object of the present invention is to provide a utility pole crossarm brace means having rigidly attached end brackets, preferably formed of noncorrosive materials, to assure that the connecting areas for the brackets may be free from any accelerated deterioration, or even exhibit any deterioration when used over a sustained period of time. A further object of the present invention is to provide a brace means for a utility pole crossarm having end brackets that are securely engaged therewith, while the connection of the brace and crossarm can be performed without the need for any supplemental connectors, but rather, can be achieved through the unique formation of the bracket means that provides for its snug securement and gripping into its proximate brace through integral adhering means. A further object of the present invention is to provide rib engagement means for the bracket ends and which tightly bind into the crossarm brace means during application. All that is required is the exercise of reasonable force, initially, when connecting the brackets to the ends of its respective brace means, just prior to their combined installation upon a utility pole for supporting a crossarm in place. A further object of the present invention is to provide a method for forming bracket means for extension brace means and for use in attachment to a utility pole and for supporting the crossarm carried thereby. An additional object of the present invention is to provide bracket end means for a utility pole crossarm brace which cooperates with means for assuring a locking engagement between the various brackets, and their respective brace means ends. An additional object of the present invention is to generally improve the design, construction, and efficiency of installation and usage of crossarm brace means when installed high upon a utility pole.

Essentially, the improvement of this current invention over what is disclosed in my earlier U.S. Pat. No. 3,468,571, includes the replacement of the wedge means and its beveled surfaces as previously designed upon that intermediate portion of the bracket with a hook means that is positioned on the end of the intermediate strut and which provides for a significant embedding relationship with the interior aperture formed communicating with the ends of the proximate brace means to which this bracket secures. A lateral insertion of the bracket, under force, with the brace means provides an embedment of these hook-like integral components of the strut, and which function as barbs, binding into the contiguous wood at the surface of the annular slot formed transversely at the brace means end. This double hooked barbed-like formation at the end of the strut functions as an anchor means to assure a more tighter and binding adherence of the bracket to the end of its respective brace means. In addition, and as can be seen, hook means are likewise formed at the ends of the outer flanges for the bracket, to further assure that any vibration or other movements to the brace means, or significant forces exerted upon the crossarm, will simply add to the embedment of these hook means into the crossarm brace, assure its fixed mounting in place, and provide for stabilization of the crossarm as supported.

The above features of this invention improve the design, construction, and efficiency of functioning of the crossarm brace means of this invention by furnishing a more effective means for securement of the brackets into the crossarm braces so that they are more firmly and effectively attached between their securement with the utility pole at one end, and to the crossarm at their other end, and will be better able to withstand continuing exposure to weather, vibrations, or other adverse conditions that heretofore tended to weaken the securement of these components in place.

DESCRIPTION OF THE PREFERRED EMBODIMENT

Figure 1:
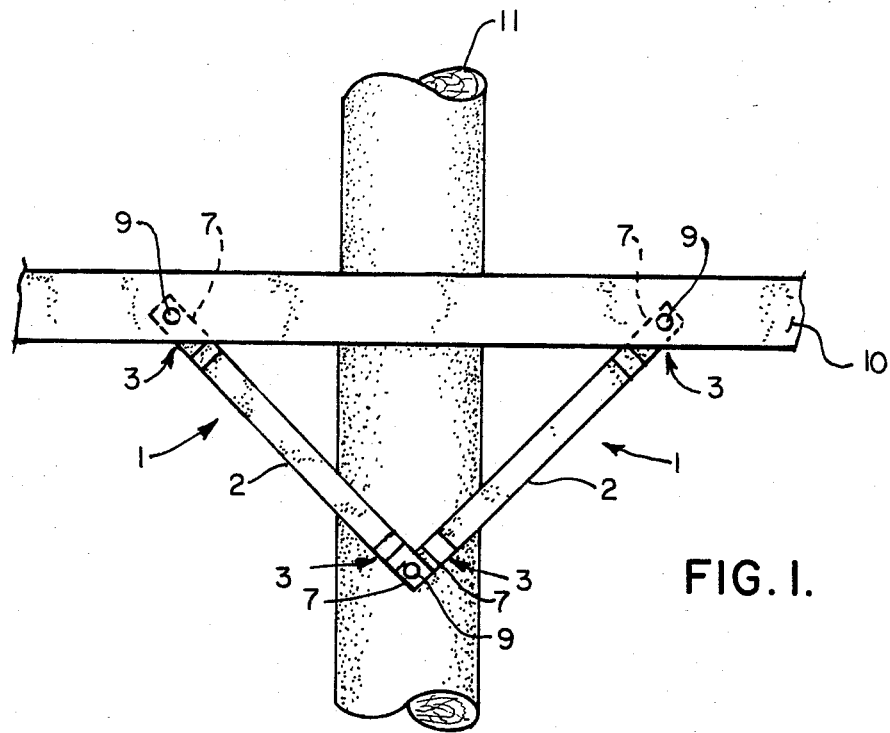
FIG. 1 provides a front elevational view of the perferred embodiment disclosing the various brackets and brace means securing with the utility pole, and for supporting the crossarm as installed.

The present invention comprises a brace means, which includes substantially elongated struts 1, preferably formed of a non-conductive material, such as wood, plastic, and the like. Connecting with each of the struts of the brace means are the end brackets 3, as will be subsequently described.

The struts are provided at their respective ends with laterally disposed outer indentations 4, in addition to slot 5, extending inwardly from their ends, and with slot orifices 6 arranged substantially coextensive with the width of the struts 2, and provided inwardly of the ends substantially along the longitudinal axis of the said struts. Each strut is provided with its slot 5 extending somewhat inwardly of the end of the strut and disposed laterally substantially equidistant between the upper and lower faces thereof, and with the slot communicating with its slot orifice 6, as shown.

Each bracket 3 comprises a substantially flat portion 7, including an aperture 8 formed therein, somewhat inwardly of the outer end thereof, and adopted for accommodating a bolt or screw means 9 provided for attaching each bracket 3 to the crossarm 10 as carried by the utility pole 11. Or, in the alternative, where the brackets are disposed downwardly of the crossarm, as at their other ends, then they may be bolted together and secured directly to the utility pole, as can be noted at the shown lower disposed bolt 9.

Figure 2:
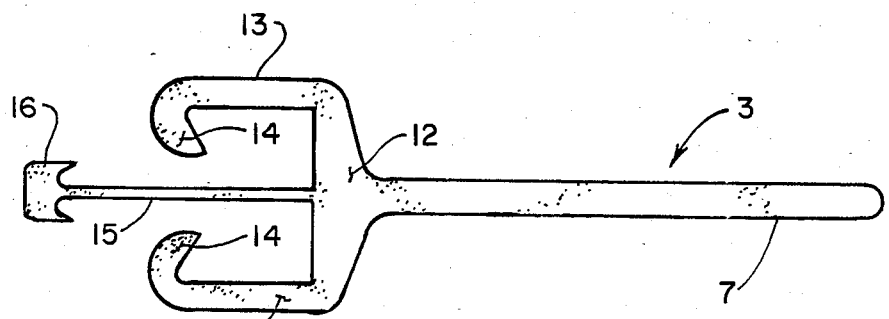
FIG. 2 is a side view of one of the brackets of this invention.

The end of each strap member 7 remote from its operative end thereof is rigidly connected to a base 12 that extends substantially perpendicularly away therefrom. The bracket includes a pair of flanges 13, integrally formed at each end of the base 12, and extends coextensively of the strut, as can be noted in FIG. 2. At the tip end of each flange there is provided hooks 14 rigidly attached thereto, and which curve back towards the base member 12, for purposes as to be subsequently described. The bracket further comprises an integral rib member 15 attaching at one end with the base member 12, and extending perpendiculaly away therefrom, in alignment with the strap 7, and is arranged substantially equidistant, spacewise, relative to the pair of flanges 13.

The outer edge of the rib 15 is provided with a double hooked configured anchor means that is integrally attached thereto and arranged coextensive in length with the width of the slot 5. The hooks 14, of the flanges 13, in addition to the formed hooks of the rib 15, provide means for engagement by way of embedding into the proximate end of any crossarm brace to which this bracket is applied.

Figure 3:
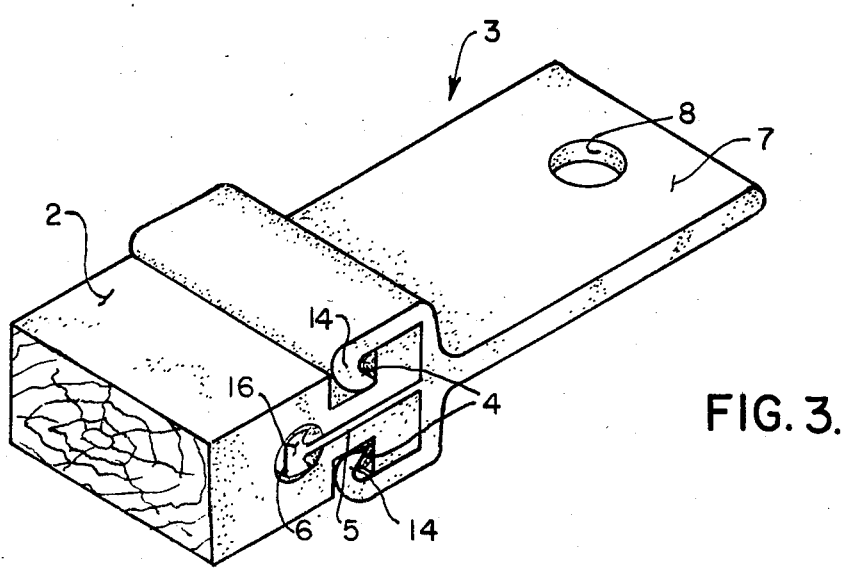
FIG. 3 is an isometric view showing the connection of one of the brackets with a proximate end of one the designed crossarm braces of this invention.

In use, each bracket 3 of the crossarm brace is affixed to the respective ends of the strut 2 by aligning the rib and flanges, of each bracket, with the respective indentations 4, in addition to the aperture 6 and its aligned slot 5, as previously explained, and through the exertion of substantial force the bracket can be laterally forced and slid into embedding engagement within these various openings, until it becomes fully aligned and located in its connective position at the end of the strut, as can be so clearly seen in FIG. 3. As the brackets are moved laterally across the ends of the strut, its various hooked ends moderately embed within the formed wood of its respective strut, to assure a very tight and contiguous fit of these components together, and due to the slight embedment of the hooks in place, they tend to resist any deterioration or loosening of these components with respect to each other, even after prolonged usage. And, should any vibrations be exerted upon these operative components as mounted high upon a utility pole, such movements have a tendency to further embed and fix these components together, rather than loosen them from their firm adherence.

Variations or modifications to the structure of this invention may occur to those skilled in the art upon reviewing the disclosure of this application. Such variations or modifications, if within the spirit of this invention, are intended to be encompassed within the scope of any claims to any patent protection issuing hereon. The description of the preferred embodiment set forth herein, and as disclosed in the drawing, is done so for illustrative purposes only.

Having thus described the invention what is claimed and desired to be secured by Letters Patent is:

1. Brace means for supporting a cross arm upon a utility pole, comprising, strut means including, slots formed in the opposite ends thereof along the longitudinal axis of said strut, slot orifice being disposed laterally thereof, at the end of each formed slot, lateral outer indentations formed upon each strut, and aligned proximate the end of a strut, bracket means rigidly attached to the ends of said strut and each comprising flange means, base means holding said flange means in spaced relation, rib means disposed intermediate said flange means and integrally extending from said base means for insertion into said strut slot, hooked anchor means formed as curved back hooks carried by said rib means for engagement within said slot orifice, hook means formed as curved back hook carried by said flange means for engaging with the contiguous proximate and a substantial portion of the end of the strut means and substantially within the lateral outer indentations formed of the said strut means, said hooked anchor and hook means extending back towards said base means, and means upon said brackets for affixing said brace means to a utility pole and cross arm mounted thereupon.

2. The invention of claim 1 and wherein said hooked anchor means comprising a double hooked anchor means.

* * * * *